Dec. 18, 1945.   D. GREGG   2,391,306
FLOW REGULATING SYSTEM
Filed Dec. 18, 1942
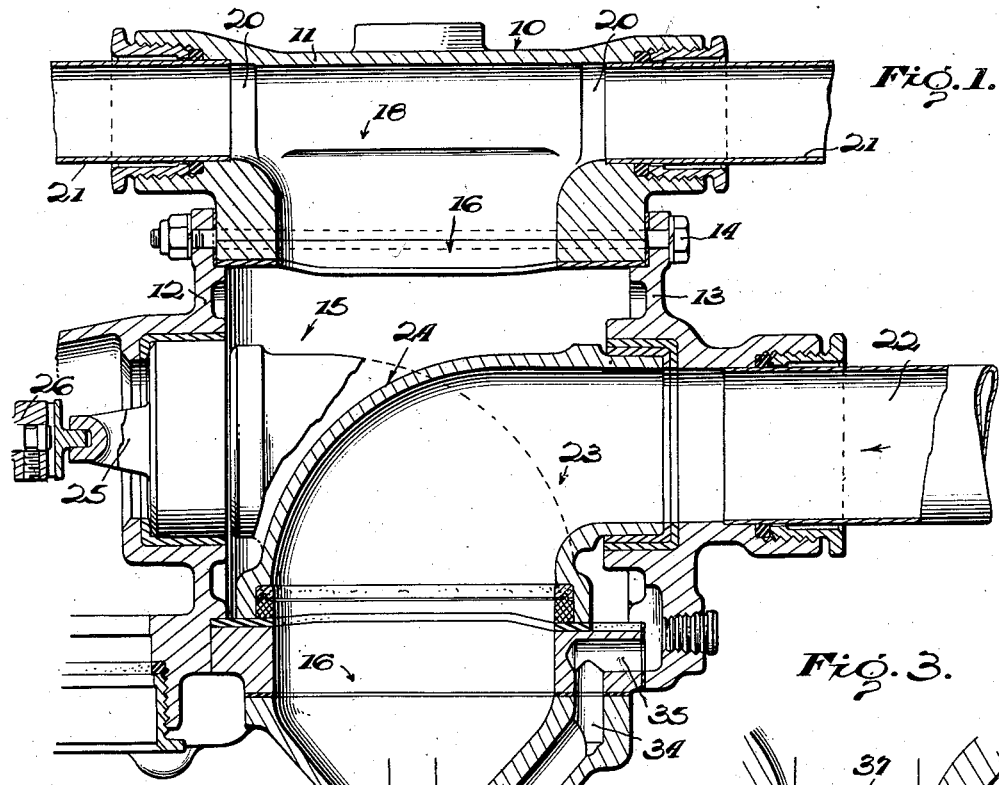
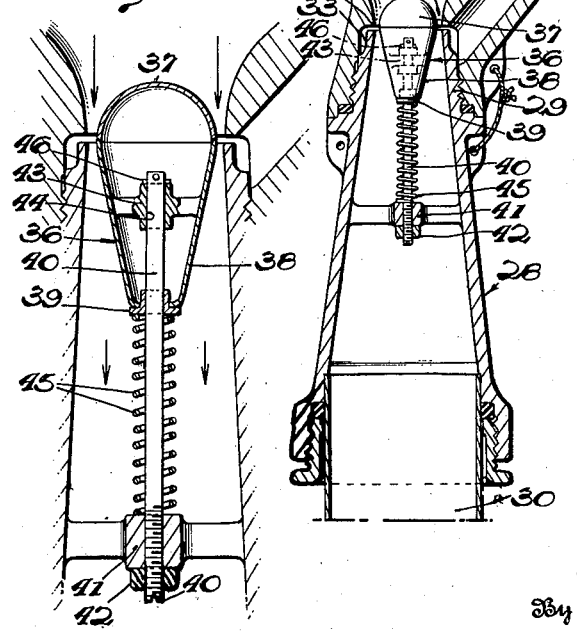
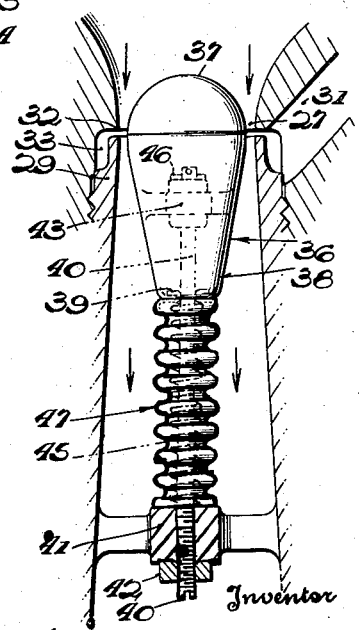
Inventor
David Gregg
By David F. Doody
Attorney Patented Dec. 18, 1945

2,391,306

UNITED STATES PATENT OFFICE 2,391,306

FLOW REGULATING SYSTEM

David Gregg, Caldwell, N. J., assignor to Bendix Aviation Corporation, South Bend, Ind., a corporation of Delaware Application December 18, 1942, Serial No. 469,490

11 Claims. (Cl. 230—112)

This invention relates to fluid flow regulating systems, and particularly to a system for regulating the flow of air in a Venturi tube.

It is an object of the present invention to provide a means for automatically regulating the air flow and pressure conditions in a Venturi tube subject to varying air flow conditions.

Other objects of the invention include the provision of means for regulating the suction pressure in a line, which pressure is derived from a Venturi tube, and the provision of pressure sensitive means for adjusting air flow in accordance with changes in the pressure of fluid flowing through a Venturi tube.

Other objects will appear from a study of the following specification when made in conjunction with the attached drawing, throughout which like numerals designate like parts.

Fig. 1 is a longitudinal, sectional view of an air distributing valve showing one embodiment of the invention therein.

Fig. 2 is an enlarged, sectional detail of the embodiment of the invention shown in Fig. 1; and Fig. 3 is a sectional and elevational view of a second embodiment of the invention.

In certain aircraft ice-eliminating systems, air is directed in cycles to individual, inflatable boot elements on the leading edges of aircraft surfaces to crack ice formations which are then carried away by the air stream. In the more recent of these systems, suction or sub-atmospheric pressure is placed upon the interior of the boot elements when they are not in use, in order to prevent ballooning and fluttering of the elements under conditions of low external pressure encountered in flight, since ballooning and fluttering upset the profile of the wing or other aerodynamic surfaces, and limit the speed and maneuverability of the craft, and also subject the material of the boots to undue vibration.

In accordance with the present invention, an air distributing valve for a deicer system is provided with a valve chamber open to suction or sub-atmospheric pressures and an engine-driven pump, which supplies air to the distributor valve for inflating the boots, creates the necessary suction through a Venturi tube located in the exhaust line of air being by-passed to a point of low pressure exteriorly of the craft, when the distributor valve is in its "off" condition.

Due to the wide variation in air flow through the Venturi tube between the takeoff condition at sea-level, and the cruising condition at high altitude, it is difficult to obtain satisfactory suction pressures upon the interior of the boots for all flight conditions. At sea-level takeoff, the engine driving the pump is rotating at its maximum R. P. M., and therefore, the pump delivers its maximum of air through the venturi, and the resulting flow is more than twice the flow met with in the high altitude cruising condition of flight, so that, with a small Venturi tube designed for the cruising condition, the back pressure through the Venturi tube, at the take-off condition, prevents the maintenance of the required suction pressure in the boots.

A Venturi tube suited to the sea-level takeoff condition would be much too large to maintain proper suction for the high altitude cruising condition. The problem of automatically satisfying these extreme conditions has been solved by the present invention.

Having reference to Fig. 1, there is shown at 10 a distributor valve including a generally cylindrical housing 11 having end plates 12 and 13 secured to cylindrical housing 11 by through bolts 14. A cylindrical chamber 15 has a series of radially extending ports 16 opening thereto. The bottom port 16 connects to a Venturi tube 17 secured to housing 11 by studs or bolts. The other ports 16, only one of which is shown, connect to a series of transverse passageways 18 opening into oppositely disposed ports 20, to which are connected pipes or conduits 21 leading to the individual boot elements mounted on the leading wing and tail edges of the craft.

Air from an engine-driven pump enters through conduit 22 into the air passageway 23 or rotor 24. Rotor 24 connects, through a spider member 25, to the shaft 26 of an electric motor, so that when the deicer distributor rotor 24 is rotated, air will be directed in a definite cycle to all the ports 16.

By means of a special switch, which is no part of the present invention, and hence, is not shown, whenever the pilot breaks the motor circuit, rotor 24 will continue to rotate until passageway 23 opens into the bottom port 16, as shown, and rotation will then cease. Thus, in the system's "off" condition, the air from the engine-driven pump will be passed through venturi 17.

Venturi 17 includes a throat portion 27, and a velocity tube 28, which is connected to throat portion 27 by means of a screw-threaded connection 29. Venturi 17 connects, through velocity tube 28, to a conduit 30, which leads to the exterior of the craft, preferably at a low pressure, trailing portion of the craft.

A passageway 31 is formed in the casting containing the upper part of venturi 17, and this passageway opens into throat 27 by means of an annular aperture 32 and chamber 33 in communication therewith, formed at the union of velocity tube 28 with the upper portion of venturi 17. Passageway 31 opens into valve chamber 15 by way of the communicating bores 34 and 35 drilled into the casting of the valve housing.

It is desired to maintain a constant suction pressure, for example, four inches of mercury, in chamber 15 and passageway 31 when the deicing system is not in operation, so that the boots in communication with chamber 15 will not flutter. The suction pressure is controlled by the air flow through Venturi tube 17.

Throat 27 of Venturi tube 17 is made large enough to pass the largest air flow to be accommodated in operation of the craft and also maintain proper suction in passageway 31 at that air flow. As stated above, the takeoff condition imposes this air flow on the Venturi tube. The present invention teaches the use of a means to automatically adjust the air flow through Venturi tube 17 for all conditions of pump output less than the maximum, or takeoff, condition.

A hollow, streamlined member 36 is disposed within the throat 27 and presents a bulbous head portion 37 to the air stream passing through venturi 17, and a trailing portion 38 tapering to a small opening containing a bushing member 39. A rod 40 has one end within streamlined member 36, and its other end screw-threaded at 40 to a supporting spider member 41 carried by the interior wall of velocity tube 28. Rod 40 carries a locking nut 42 for maintaining the rod fixed within spider 41. Streamlined member 36 contains an integral spider member 43 which is provided with a cylindrically extending, central bore 44, through which rod 40 extends, with a low-friction, sliding fit. Rod 40 has a similar fit within bushing 39, while a helical spring 45, under compression, is confined between bushing 39 and spider 41. A pin 46 extends transversely across the end of rod 40 to prevent spring 45 from forcing spider member upwardly beyond a predetermined amount, thus limiting the position of member 36 for low air flow conditions. Downward motion of member 36 is limited by contact of the upper end of rod 40 against the inner surface of the bulbous portion 37 of member 36. The bulbous and trailing portions of member 36 may be joined by a threaded union 46 which presents a smooth, unbroken exterior surface to air flowing through Venturi tube 17.

If it is desired to compensate the action of spring 45 for different atmospheric pressures, so that, regardless of altitude, the streamlined member 36 will be positioned in venturi 37 in accordance with the head of dynamic pressure flowing past bulbous portion 37, an evacuated, flexible, metallic bellows 47, as shown in Fig. 3, may be sealed to the bushing 39 at one end, and made to fit onto rod 40, adjacent the spider 41, with a fluid-tight seal. Spring 45 will be within bellows 47, but at low atmospheric pressures, bellows 47 will be expanded slightly over its condition at sea-level pressure, and will permit streamlined member 36 to be positioned forward, or upwardly at low atmospheric pressure, due to the action of spring 45.

It will be understood that, at low rates of air flow, member 36 will be advanced fully into its most forward position (as shown) by virtue of the spring 45, and as the rate of air flow increases, member 36 will be forced back on rod 40, modifying the flow of air through throat 27, and at maximum air flow, presenting the least obstruction to air flow by exposing the largest cross-section of free air space between member 36 and interior wall of velocity tube 28. The contour of Venturi tube 17 posteriorly of throat 27 is such that the cross-section of the air passageway therethrough constantly increases; hence, as member 36 is forced downwardy by air pressure, the free area surrounding member 36 increases.

While only two embodiments of the present invention have been shown in the drawing, it is to be understood that various changes may be made without departing from the scope of the present invention. For this reason, it is intended not to limit the invention by the description herein given as an example, but solely by the scope of the appended claims.

What is claimed is:

1. A suction pressure regulating mechanism, comprising a Venturi tube open to varying dynamic pressures, a suction line to be regulated opening into the throat of said Venturi tube, a streamlined member mounted within said Venturi tube adjacent said throat, supporting means mounted within said Venturi tube carrying said streamlined member, and spring means positioned on said supporting means and urging said streamlined member toward the head of dynamic pressure through said Venturi tube.

2. In combination with a Venturi tube subject to varying fluid flow therethrough, said Venturi tube having a throat portion, a suction line opening into said Venturi tube at said throat portion, means for regulating the pressure in said Venturi tube, comprising a streamlined member mounted within said Venturi tube, resilient means urging said streamlined member in a direction against the flow of fluid through said Venturi tube, and means for modifying the action of said resilient means in accordance with external pressures to which said fluid flow may be subjected.

3. In combination with a Venturi tube subject to varying fluid flow therethrough, said Venturi tube having a throat portion, an annular passageway opening into said throat portion, a suction line opening into said annular passageway, means for regulating the pressure in said Venturi tube, comprising a streamlined member mounted within said Venturi tube adjacent said throat portion, resilient means biasing said streamlined member in a direction opposed to the direction of fluid flow through said Venturi tube, and means for limiting the action of said resilient means.

4. In combination with a Venturi tube having a throat portion, a suction line opening into said throat portion, means for regulating the pressure in said suction line, comprising a streamlined member mounted in said Venturi tube adjacent said throat portion and resilient means urging said streamlined member toward the head of dynamic pressure of fluid flowing through said Venturi tube, whereby, upon an increase in the dynamic pressure in said Venturi tube said streamlined member will be moved against the action of said resilient means to regulate the pressure in said suction line.

5. In combination with a Venturi tube subject to varying fluid flow therethrough, said Venturi tube having a throat portion, a suction line opening into said throat portion, means for regulating the pressure in said Venturi tube, comprising a control member for regulating the fluid flow through said throat, said control member positioned within said Venturi tube and adjacent said throat portion, said control member movable in one direction under the biasing force of the fluid flow through said Venturi tube, and tension means biasing said control member in a second direction in opposition to the biasing force of said fluid flow.

6. In combination with a Venturi tube subject to varying fluid flow therethrough, said Venturi tube having a throat portion, a suction line opening into said throat portion, means for regulating the pressure in said Venturi tube, comprising a head portion adjustably mounted within the Venturi tube and adjacent the throat portion, said fluid flowing around said head portion in passing through said throat portion, said head portion movable in one direction under the biasing force of the fluid flowing through said Venturi tube for enlarging the passage for said fluid at said throat portion, and spring tension means biasing said head portion in an opposite direction for decreasing the passage for said fluid at said throat portion, whereby a substantially constant pressure may be maintained in said suction line under the varying fluid flow through said Venturi tube.

7. In combination with a Venturi tube subject to varying fluid flow therethrough, said Venturi tube having a throat portion, a suction line opening into said Venturi tube at said throat portion, means for regulating the pressure in said Venturi tube, comprising a head member mounted within said Venturi tube, resilient means for urging said head member in a direction against the flow of fluid through said Venturi tube, and atmospheric pressure responsive means for modifying the action of said resilient means.

8. In combination with a Venturi tube subject to varying fluid flow therethrough, said Venturi tube having a throat portion, a suction line opening into said Venturi tube at said throat portion, means for regulating the pressure in said Venturi tube, comprising a streamlined member mounted within said Venturi tube, resilient means for urging said streamlined member in a direction against the flow of fluid through said Venturi tube, and means for modifying the action of said resilient means in accordance with varying pressure conditions to which said flow of fluid may be subjected.

9. In combination with a Venturi tube subject to varying fluid flow therethrough, said Venturi tube having a throat portion, a suction line opening into said Venturi tube at said throat portion, means for regulating the pressure in said Venturi tube, comprising a streamlined member mounted within said Venturi tube, resilient means for urging said streamlined member in a direction against the flow of fluid through said Venturi tube, and atmospheric condition responsive means for modifying the action of said resilient means in accordance with atmospheric conditions to which said fluid flow may be subjected.

10. The combination, comprising, a rotary valve, a pressure inlet for said valve, first and second pressure outlets for said valve, and said valve arranged to alternately connect said first and second pressure outlets to said pressure inlet, a Venturi tube connected to said second pressure outlet, said Venturi tube having a throat portion, a suction line opening into said throat portion, a fluid pressure responsive member positioned within said Venturi tube and adjacent said throat portion, said member movably mounted for regulating the flow of fluid through said throat in response to the pressure of said fluid in such a manner as to control the suction force in said suction line, and said rotary valve arranged to connect said suction line to said first outlet upon said second outlet being connected to said pressure inlet.

11. The combination, comprising, a rotary valve, a pressure inlet for said valve, first and second pressure outlets for said valve, and said valve arranged to alternately connect said first and second pressure outlets to said pressure inlet, a Venturi tube connected to said second pressure outlet, said Venturi tube having a throat portion, a suction line opening into said throat portion, a member positioned within said Venturi tube and adjacent said throat portion, said member movably mounted for regulating the flow of fluid through said throat in such a manner as to control the suction force in said suction line, pressure responsive means for adjustably positioning said member so as to maintain said suction force at a substantially constant predetermined value under varying inlet pressure values, and said rotary valve arranged to connect said suction line to said first outlet upon said second outlet being connected to said pressure inlet.

DAVID GREGG.